Aug. 25, 1942.　　　　L. A. TURNER　　　　2,294,142

PIPE JOINT

Filed Dec. 11, 1940

INVENTOR

Lionel Alfred Turner

BY

Edwards, Bower & Pool

ATTORNEYS

Patented Aug. 25, 1942

2,294,142

UNITED STATES PATENT OFFICE 2,294,142

PIPE JOINT

Lionel Alfred Turner, Old Bexley, England, assignor to Keasbey & Mattison Company, Ambler, Pa., a corporation of Pennsylvania Application December 11, 1940, Serial No. 369,576
In Great Britain December 21, 1939

2 Claims. (Cl. 285—196)

This invention relates to joints for pipes made of asbestos-cement or like material, that is to say, composed essentially of fibrous material and an hydraulic binder. The advantages of such pipes, in particular as regards their non-corrosive properties, are well known, and these advantages can be extended if the joints used to connect the pipe can be made of similar non-corrosive material. The invention aims at providing a very simple form of such a joint in which the necessity for machining screw-threads is avoided.

The invention is concerned with that type of joint in which a packing ring or gasket is deformed in an annular recess formed in one of two surfaces to be sealed and makes contact with the other surface to be sealed. The invention includes spigot-and-socket joints, but it is particularly applicable to joints between two plain-ended pipes. By a plain-ended pipe I mean an ordinary pipe devoid of any integral socket. Such a pipe is usually a plain cylinder of uniform wall thickness throughout, but it may be slightly tapered at the end if desired.

According to the invention, the annular recess is formed in the socket of a socketed pipe or in a sleeve of asbestos-cement or like material that extends over the adjacent ends of two plain-ended pipes, and a plain-ended pipe is simply forced home axially into the socket or sleeve to make the joint. The recess, which is preferably located close to the end of the socket or sleeve, contains a deformable ring or gasket that has a face which slopes inwards towards the axis of the joint from that part of the ring or gasket with which the inserted pipe first comes into contact, so that as the pipe is forced home the ring or gasket is progressively forced into the annular recess. It will be understood that if two plain-ended pipes are being joined, each is forced into a common sleeve in the way described, the sleeve having two recesses and rings or gaskets. By the invention the number of components of the joint is reduced, and none need have a screw-thread formed on it.

The cross-sectional shape of the ring or gasket is important. Preferably it is elongated, i. e. longer axially than radially, and the inwardly-sloping face is straight, and in any case the shape should be such that the ring or gasket is forced home substantially uniformly as the pipe is forced into the socket or sleeve. The shape of the recess must, of course, be correlated with the cross-sectional shape of the ring or gasket if progressive deformation is to take place and a tight joint is to be ensured.

An important feature of the invention consists in dividing or forking part of the ring or gasket in cross-section in such a way that the pressure inside the pipe line tends to spread the arms of the fork apart.

Owing to the fact that pipes and sleeves of asbestos-cement or similar material are necessarily made to a range of tolerances, it follows that the design of the recess and gasket must be such as to afford a fluid-tight joint throughout the range of tolerances. The customary tolerance is plus or minus one-sixteenth of an inch both for the sleeves and the pipes, so that, in the worst case of a "minimum" pipe and a "maximum" sleeve, there is a discrepancy of one-eighth of an inch between the two components. It is evident, therefore, that a further advantage of dividing or forking the ring or gasket is that a tight joint results even though the diametrical dimensions of the pipes and sleeves may depart somewhat from the designed limits. Although the gasket is substantially packed in all cases, the extent of the packed effect depends upon the actual dimensions of the annular recesses and of the pipes.

In order to ensure that the incoming pipe will centre itself automatically and be guided when it first enters the joint, the ring or gasket is preferably so shaped that at its mouth it is larger in diameter than the pipe, so that the pipe does not come into contact with it until the end of the pipe is inside the mouth.

Some examples of pipe joints in accordance with the invention will now be described with reference to the accompanying drawing, in which.

Figure 2:
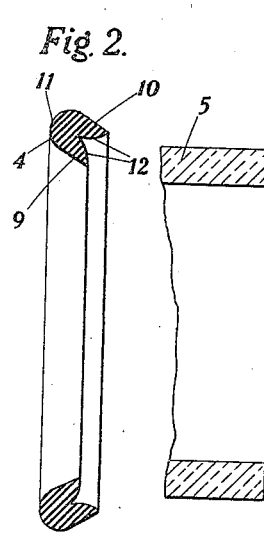
Figure 2 is a diametrical section through one form of gasket for use in making the joint with the parts shown in Figure 1.
Figure 1:
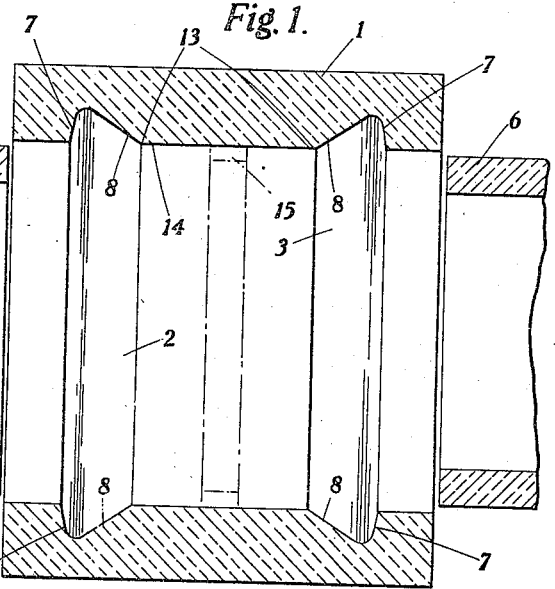
Figure 1 shows the ends of two plain-ended pipes and the co-operating sleeve, prior to assembly of the joint.
Figure 3:
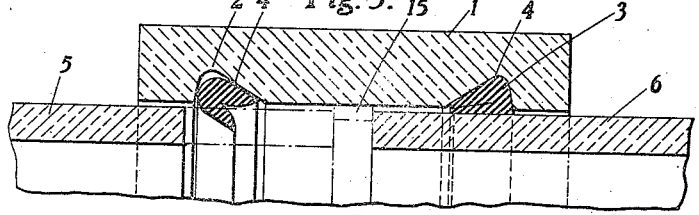
Figure 3 is a fragmentary view illustrating the stages in the assembly of the joint with the parts shown in Figures 1 and 2.

Referring first to Figures 1 to 3, a sleeve 1 of asbestos-cement is formed near its ends with two internal annular recesses 2 and 3 each of which serves to accommodate a ring-like rubber gasket 4 of the form shown in Figure 2. The left-hand portion of Figure 3 shows one of the gaskets 4 in position in the recess 2 before the end of a pipe 5 is forced home in the sleeve (into the position shown in dotted lines), and the right-hand portion of this figure shows the other gasket compressed in its recess 3 after the other pipe 6 has been forced home.

The side 7 of each recess, at which the corresponding pipe enters the sleeve, makes an angle of approximately 80° with the axis of the sleeve, and the further side 8 is inclined at an angle of about 30° to that axis. The gaskets 4 are of elongated cross-section, being longer axially than radially, and, when in the undeformed condition represented in Figure 2, the inner and outer faces 9 and 10 are substantially parallel and make an angle of about 30° with the axis of the gasket. The faces 9 and 10 merge into a rounded part 11 at the mouth of the gasket, viz. the opening that first receives the inserted pipe end, and the remaining part 12 of the gasket is forked as shown. The result is that when the joint has been made, as indicated at the right-hand of Figure 3, the fluid pressure in the pipe line tends to spread the arms of the fork apart and so enhance the effectiveness of the sealing.

As indicated at the left-hand of Figure 3, the mouth of the gasket 4 is arranged to be slightly larger than the external diameter of the pipe end so as to centre the pipe when it is being inserted.

A slight modification of the construction shown in Figures 1 to 3 consists in terminating the side 8 of the recesses 2 and 3 short of the point 13 (Figure 1) and extending the portion 14 of the sleeve until it meets the perpendicular dropped from the shortened termination of the side 8. That is to say, a radial abutment is provided in this way for the forked part of the gasket and obviates any risk of it being jammed outside the recess 2 or 3 between the pipe and the sleeve.

In another modified form of construction, the sleeve 1 is formed with a centrally disposed internal collar 15 which is provided for the purpose of preventing the possibility of the sleeve sliding axially from one pipe end to the abutting pipe end under conditions of unbalanced fluid pressure.

Figure 4:
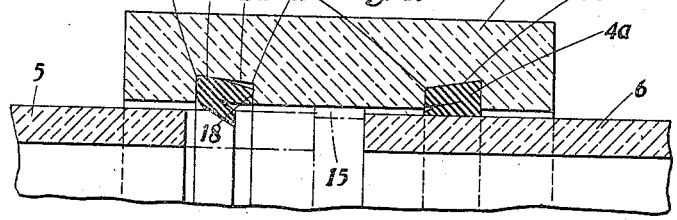
Figures 4 and 5 are corresponding fragmentary views showing gaskets of other cross-sectional shapes.

Referring now to the construction shown in Figure 4, the recesses 2a and 3a of the sleeve 1 have two parallel radial walls, the outer of which is slightly deeper than the inner, connected by an inclined peripheral wall, as shown. At the side remote from the incoming pipe, the gasket 4a is forked as shown at the left-hand of Figure 4, and it will be seen that in the undeformed condition the peripheral face of the gasket is curved so that, whereas its forward portion fits snugly in the forward corner 16 of the recess, its rear portion lies clear of the rear corner 17 of the recess. Also, it will be seen that the rear part 18 of the gasket abuts against the inner radial wall of the recess.

In the deformed state, as shown at the right-hand of Figure 4, the whole of the peripheral face of the gasket 4a is forced into contact with the corresponding wall of the recess 3a.

Figure 5:
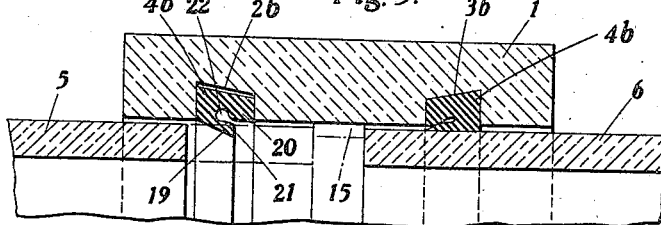

The recesses 2b and 3b in the construction shown in Figure 5 closely resemble the recesses 2a and 3a of Figure 4 but are somewhat deeper, and the peripheral wall is inclined at a slightly steeper angle. As shown at the left-hand of Figure 5, in the undeformed condition, prior to insertion of the pipe 5, the face 19 of the gasket 4b is inclined to the axis of the sleeve 1 at a slightly greater angle than the opposite face, which is substantially parallel to the peripheral wall of the recess. At the side remote from the incoming pipe, the gasket is forked as shown, the forked part having two faces 20 and 21, substantially at right angles to each other, the neighbouring ends of which are rounded and merge into a circular groove 22 formed in the body of the gasket.

In the deformed state, as shown at the right-hand of Figure 5, the rounded end of the face 21 is pressed against the corresponding protuberance on the opposite face 20 of the forked part of the gasket, thus achieving a packed effect on the gasket as a whole.

If desired, with any of the constructions illustrated, the rubber gaskets may be glued in the recesses so that the sleeve and its gaskets can be sold as a unit.

It will be seen that, when in the undeformed state, each of the forms of gasket illustrated has a substantially flat face which slopes inwards towards the axis of the joint from that part of the gasket with which the incoming pipe first comes into contact. Also, in each case, the cross-sectional shape of the undeformed gasket is elongated, i. e. longer axially than radially. The result is that, as the pipe is forced home, the gasket is progressively forced into the annular recess. Moreover, the forked construction of the gasket enhances the packing effect.

It may be mentioned that in order to assemble any of the pipe joints shown in the drawing, considerable force is generally needed to force the pipes home against the resistance offered by the gaskets. A convenient arrangement to employ for the purpose comprises metallic clamping members which are tightly clamped around the two pipes to be drawn together into the sleeve, the gripping surfaces of the clamping members being serrated in order to bite into the pipes. Right and left-handed screws, operated by a ratchet lever and screwing into the respective clamping members, are provided for drawing the sets of clamping members (and consequently the pipes) axially towards each other. To ensure correct assembly, each pipe is marked with a circumferential line which registers with the end of the sleeve when the pipe has been forced home to the proper extent. Also, an axially disposed spacing rod, which is mounted on each clamping set, is arranged to encounter a fixed abutment when the corresponding pipe has been drawn sufficiently into the sleeve, and so arrests further inward movement of the pipe.

The manner in which the invention is applied to a spigot-and-socket joint follows at once from consideration of Figures 1 and 2. Thus, it is only necessary to imagine that the sleeve 1 constitutes an integral socket on the pipe 6, and that the recess 3 is omitted. Then the joint is made by inserting the end of the pipe 5 into the gasket 4, which is held in the recess 2, and forcing it home as indicated in dotted lines in Figure 3.

I claim:

1. A pipe joint for pipes made of material consisting essentially of fibrous matter and a hydraulic binder, comprising socket means for receiving an end of at least one of the pipes to be joined, said socket means being composed of the said material and formed with an internal annular recess having at its entrance end first receiving the inserted pipe a substantially radial surface, a peripheral bottom surface of said recess disposed at an angle to said entrance end surface with inward inclination from one end to the other in the direction of insertion of said pipe end, a deformable ring-like gasket divided into an outer portion disposed in said recess and having a peripheral surface with a similar inward inclination and an inner portion connected at an angle to said outer portion and protruding inward from said recess and having an inner face similarly inclined inward toward the axis of the joint, said connected portions being of a radial thickness sufficiently greater than the depth of the said recess so that the incoming pipe end brings the dividing surfaces of said portions into contact with each other and causes said gasket to be deformed entirely to fill said recess and with the gasket radially thicker at its entrance end whereby excess outside pressure against said end produces a wedging effect on said gasket in said recess.

2. A pipe joint as defined in claim 1 in which the end of the socket recess opposite the entrance end has a substantially radial surface providing an abutment for the end of the gasket tending to hold it against rolling in the recess during the assembly of the pipe joint.

LIONEL ALFRED TURNER.